(12) United States Patent
Hiramoto et al.

(10) Patent No.: US 11,062,850 B2
(45) Date of Patent: Jul. 13, 2021

(54) CAPACITOR

(71) Applicant: Panasonic Intellectual Property Management Co., Ltd., Osaka (JP)

(72) Inventors: Shozo Hiramoto, Osaka (JP); Hiroki Takeoka, Nara (JP); Kazumasa Yoshida, Osaka (JP); Daisuke Mitani, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/547,564

(22) Filed: Aug. 22, 2019

(65) Prior Publication Data

US 2019/0378658 A1 Dec. 12, 2019

Related U.S. Application Data

(63) Continuation of application No. PCT/JP2018/003938, filed on Feb. 6, 2018.

(30) Foreign Application Priority Data

Mar. 21, 2017 (JP) .............................. JP2017-054965

(51) Int. Cl.
*H01G 4/33* (2006.01)
*H01G 4/228* (2006.01)
(Continued)

(52) U.S. Cl.
CPC ................. *H01G 4/33* (2013.01); *H01G 2/02* (2013.01); *H01G 4/012* (2013.01); *H01G 4/228* (2013.01); *H02M 7/003* (2013.01)

(58) Field of Classification Search
CPC ............ H01G 4/38; H01G 4/232; H01G 4/32; H01G 4/228; H01G 4/012; H01G 2/02; H02M 7/003
(Continued)

(56) References Cited

U.S. PATENT DOCUMENTS

| 8,416,556 B2 | 4/2013 | Grimm et al. |
| 2009/0059467 A1* | 3/2009 | Grimm .................. H01G 4/224 361/301.5 |

(Continued)

FOREIGN PATENT DOCUMENTS

| JP | 2003-163039 | 6/2003 |
| JP | 2008-541416 | 11/2008 |

(Continued)

OTHER PUBLICATIONS

International Search Report of PCT application No. PCT/JP2018/003938 dated Apr. 24, 2018.

*Primary Examiner* — Arun Ramaswamy
(74) *Attorney, Agent, or Firm* — McDermott Will & Emery LLP

(57) ABSTRACT

A film capacitor includes a capacitor element, a first bus bar, and a second bus bar. The first bus bar includes a first electrode connecting part connected to the first electrode of the capacitor element at one end and a first connection terminal at another end. The second bus bar includes a second electrode connecting part connected to the second electrode of the capacitor element at one end and a second connection terminal at another end. The first bus bar includes a branch part that is branched from a position closer to the first electrode connecting part than the first connection terminal and extends toward the second electrode along a peripheral surface of the capacitor element. The second bus bar includes an overlapping part that overlaps at least a part (Continued)

of the branch part. The overlapping part is along the peripheral surface of the capacitor element.

4 Claims, 7 Drawing Sheets

(51) Int. Cl.
*H01G 4/012* (2006.01)
*H01G 2/02* (2006.01)
*H02M 7/00* (2006.01)

(58) Field of Classification Search
USPC ...... 361/520, 301.5, 308.1, 515, 328, 306.1, 361/303, 310
See application file for complete search history.

(56) References Cited

U.S. PATENT DOCUMENTS

| 2011/0228508 A1 | 9/2011 | Inuduka et al. |
| 2017/0062134 A1 | 3/2017 | Koyama et al. |

FOREIGN PATENT DOCUMENTS

| JP | 2010-251400 | 11/2010 |
| JP | 2011-217594 | 10/2011 |
| WO | 2015/182081 | 12/2015 |

\* cited by examiner

CAPACITOR

RELATED APPLICATIONS

This application is a continuation of the PCT International Application No. PCT/JP2018/003938 filed on Feb. 6, 2018, which claims the benefit of foreign priority of Japanese patent application No. 2017-054965 filed on Mar. 21, 2017, the contents all of which are incorporated herein by reference.

BACKGROUND

1. Technical Field

The present disclosure relates to a capacitor such as a film capacitor.

2. Description of the Related Art

In case mold type capacitor disclosed in Unexamined Japanese Patent Publication No. 2010-251400, metallikon electrodes are formed in both end faces of a capacitor element that is formed by laminating or winding a metalized film. A bus bar is connected to each of the metallikon electrodes, and parts of a pair of bus bars are overlapped with an insulating plate sandwiched between them. Thus, ESL (Equivalent Series Inductance) that is an inductance component of the bus bar is decreased.

SUMMARY

A capacitor according to a main aspect of the present disclosure includes a capacitor element, a first bus bar, and a second bus bar. The capacitor element has a first end surface and a second end surface that faces to each other, and a peripheral surface connecting between the first end surface and the second end surface. And the capacitor element includes a first electrode disposed on the first end surface and a second electrode disposed on the second end surface. The first bus bar includes a first electrode connecting part at one end of the first bus bar and a first connection terminal at another end of the first bus bar. The first electrode connecting part is connected to the first electrode of the capacitor element. The first connection terminal is configured to be connected to an external terminal. The second bus bar including a second electrode connecting part at one end of the second bus bar and a second connection terminal at another end of the second bus bar. The second electrode connecting part is connected to the second electrode of the capacitor element. The second connection terminal is configured to be connected to an external terminal. The first bus bar includes a branch part that is branched from a position closer to the first electrode connecting part than the first connection terminal. And the branch part extends toward the second electrode along the peripheral surface of the capacitor element. The second bus bar includes an overlapping part that overlaps at least a part of the branch part. The overlapping part is along the peripheral surface of the capacitor element.

The present disclosure can provide the capacitor that can sufficiently secure an effect of decreasing the ESL while preventing an increase in a size.

The effect or significance of the present disclosure will be further clarified in the following description of the exemplary embodiment. However, the exemplary embodiment shown below is merely one example of implementing the present disclosure, and the present disclosure is not at all limited to the example described in the following exemplary embodiment.

DETAILED DESCRIPTION OF EMBODIMENT

Figure 1:
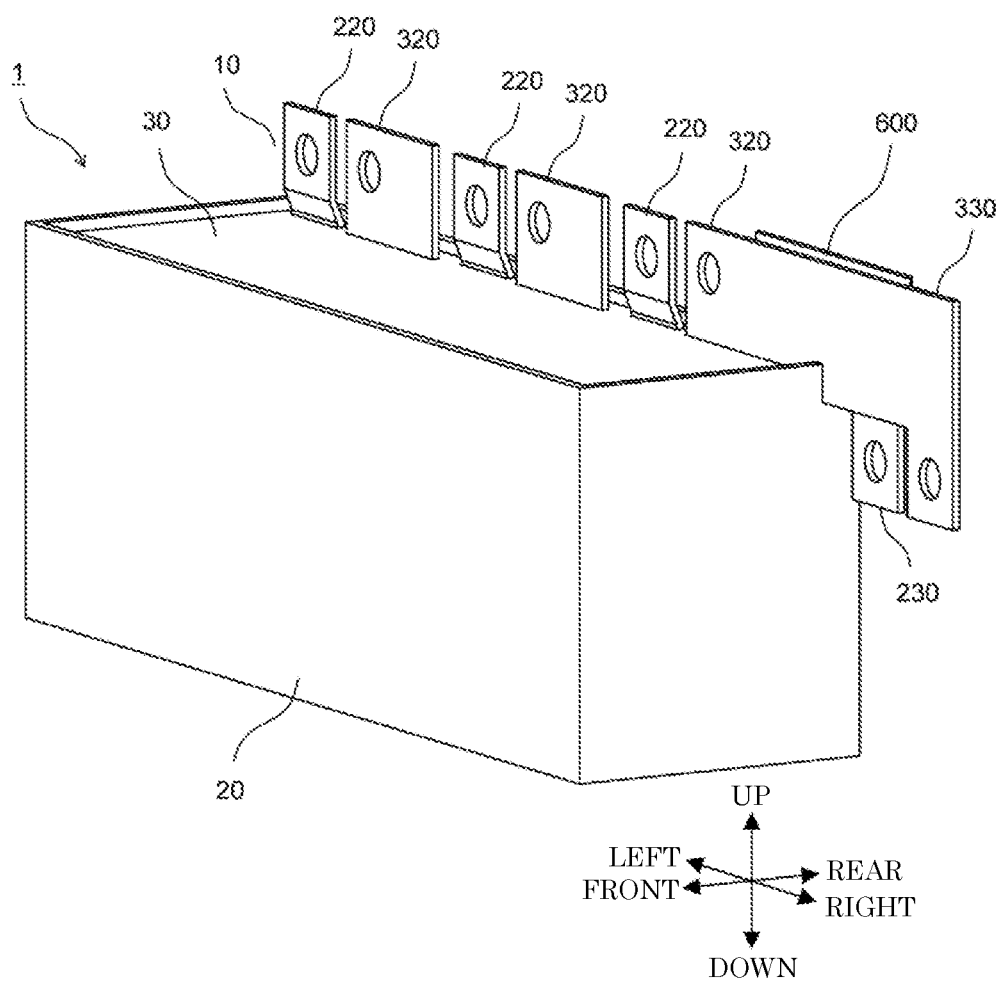
FIG. 1 is a perspective view illustrating a film capacitor according to an exemplary embodiment.

In case mold type capacitor of Unexamined Japanese Patent Publication No. 2010-251400, an overlapping part where a pair of bus bars are overlapped each other is formed so as to extend in a direction from the capacitor element toward an opening of the case. For this reason, a size of the case mold type capacitor is likely to be enlarged by the extending overlapping part.

On the other hand, if the overlapping part is shortened in order to suppress the size of the case mold type capacitor, there is a risk of insufficiently securing the effect of decreasing the ESL.

The present disclosure can provide the capacitor that can sufficiently secure the effect of decreasing the ESL while preventing the increase in the size.

Hereinafter, film capacitor 1 that is an exemplary embodiment of a capacitor of the present disclosure will be described with reference to the drawings. For the sake of convenience, directions including front and rear, left and right, and up and down are added to the drawings as appropriate. These directions are not an absolute direction but a relative direction of film capacitor 1.

In the exemplary embodiment, film capacitor 1 corresponds to "a capacitor" described in the appended claims Front-side end-face electrode 101 corresponds to "a second electrode" described in the claims, and rear-side end-face electrode 102 corresponds to "a first electrode" described in the appended claims. First bus bar 200 corresponds to "a first bus bar" described in the appended claims. First electrode connecting part 210 corresponds to "a first electrode connecting part" described in the appended claims. Insertion hole 213 corresponds to "an insertion port" described in the appended claims First connection terminal 220 corresponds to "a first connection terminal" described in the appended claims. Insertion piece 241 corresponds to "an insertion part" described in the appended claims. Second bus bar 300 corresponds to "a second bus bar" described in the appended claims Second electrode connecting part 310 corresponds to "a second electrode connecting part" described in the appended claims Second connection terminal 320 corresponds to "a second connection terminal" described in the appended claims. First insulating sheet 400 corresponds to "a partitioning member" described in the appended claims Front end 401 corresponds to "an edge part of the partitioning member" described in the appended claims.

However, the above description is only intended to define correspondences between constituents shown in the appended claims and constituents shown in the exemplary embodiment. The correspondences described above should not be construed to limit the scope of the invention described in the appended claims to the configuration described in the exemplary embodiment.

Figure 2:
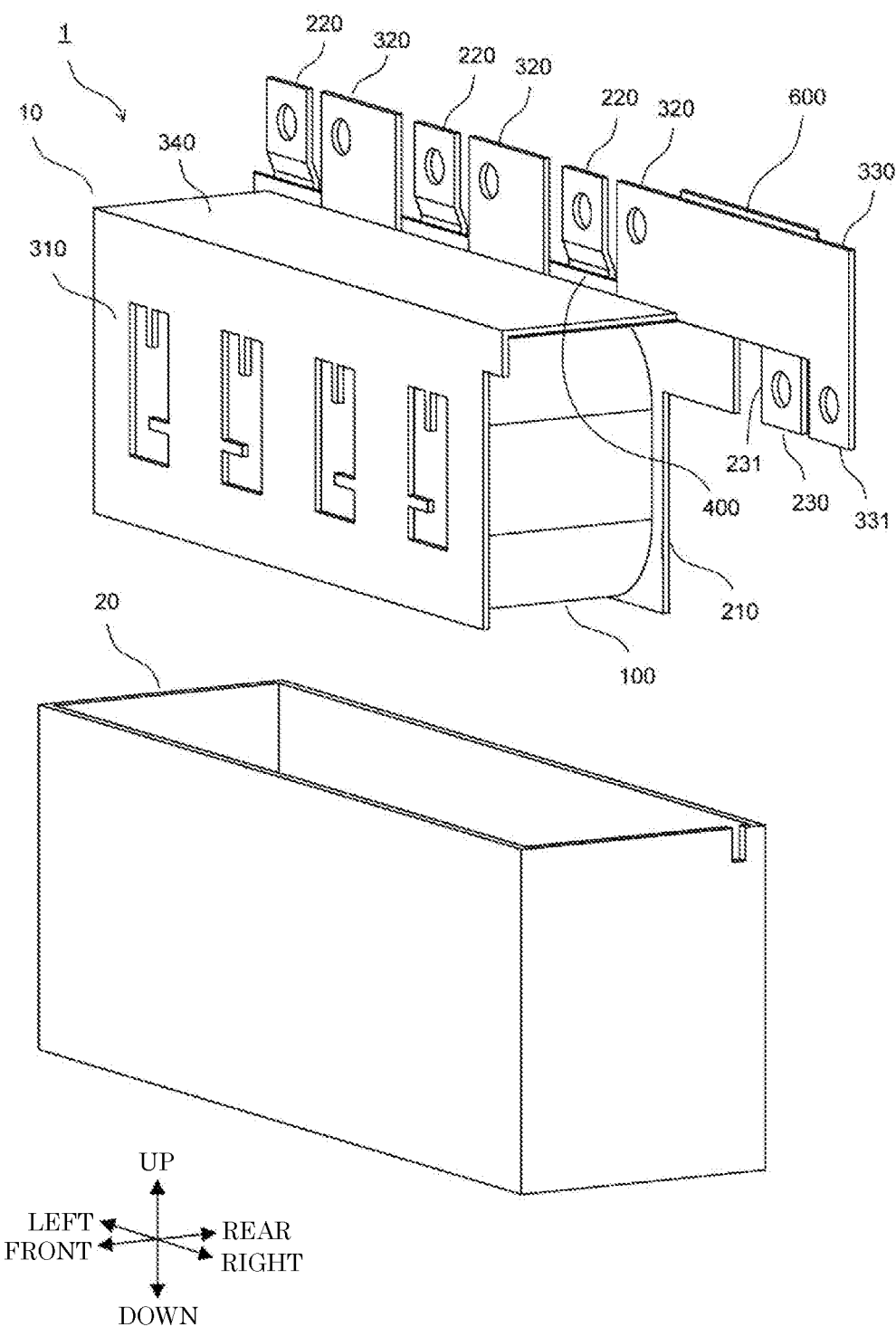
FIG. 2 is an exploded perspective view illustrating the film capacitor of the exemplary embodiment before a capacitor unit is accommodated in a case.
Figure 3:
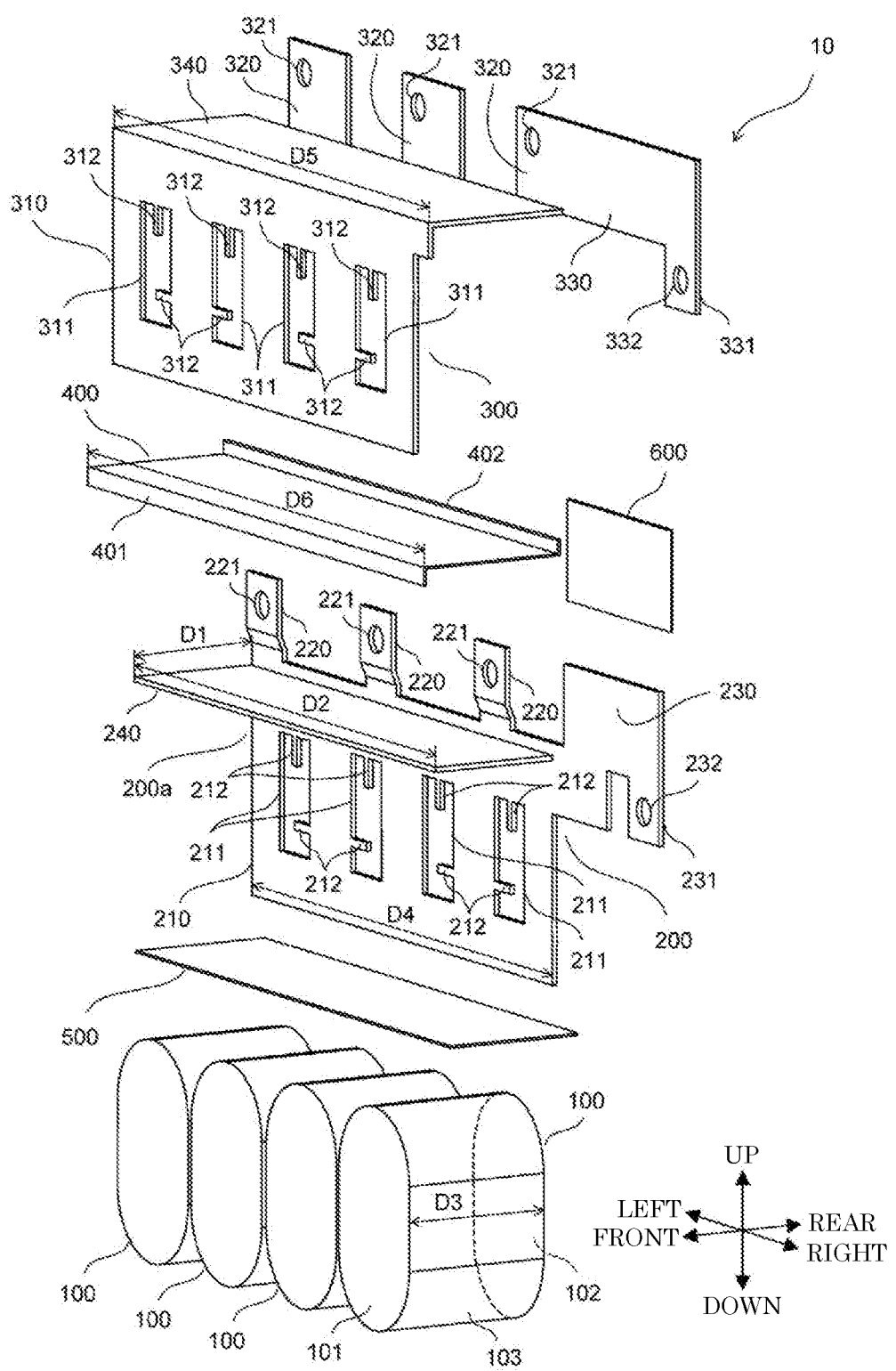
FIG. 3 is an exploded perspective view illustrating the capacitor unit of the exemplary embodiment.
Figure 4:
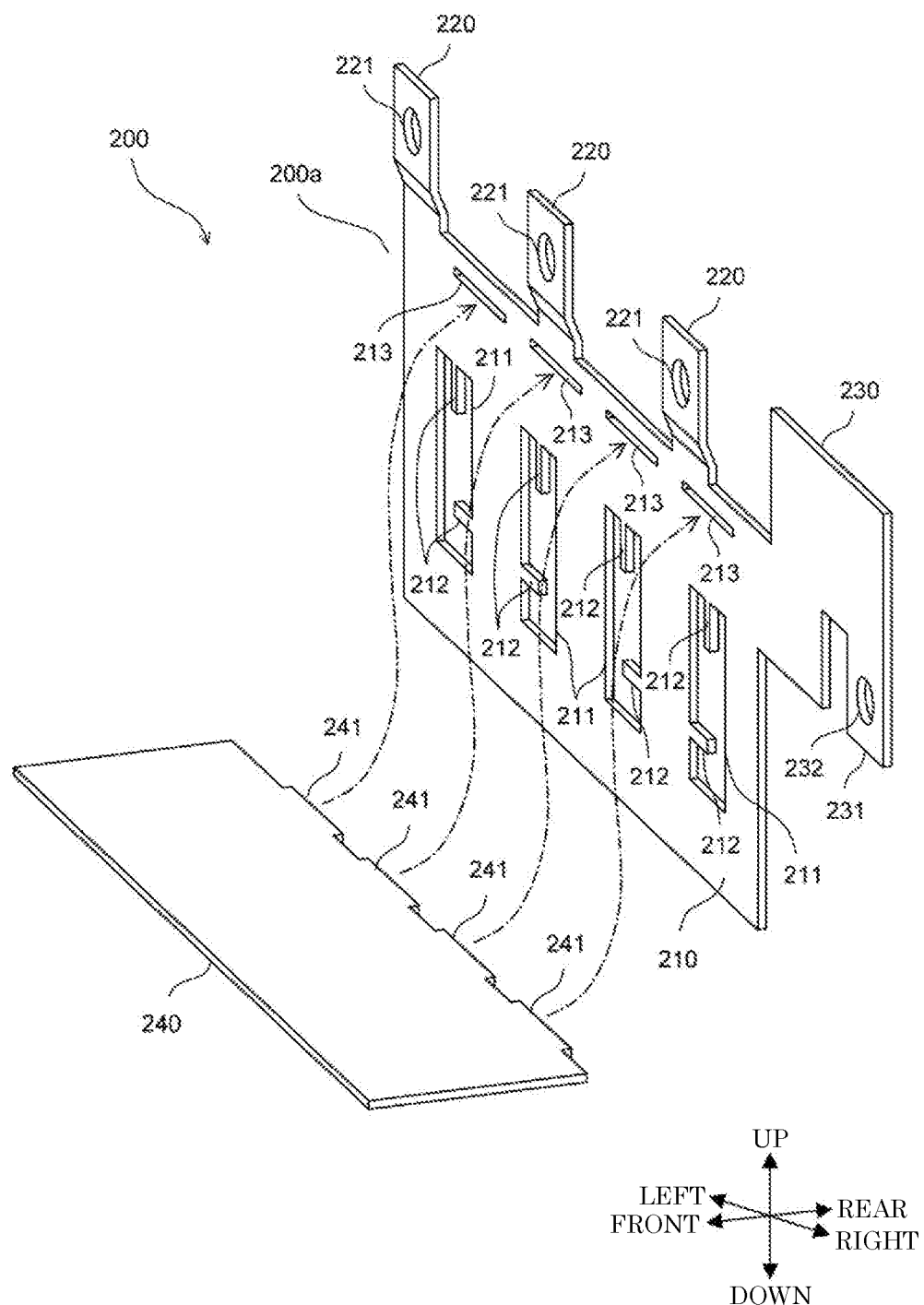
FIG. 4 is an exploded perspective view illustrating a first bus bar of the exemplary embodiment.
Figure 5:
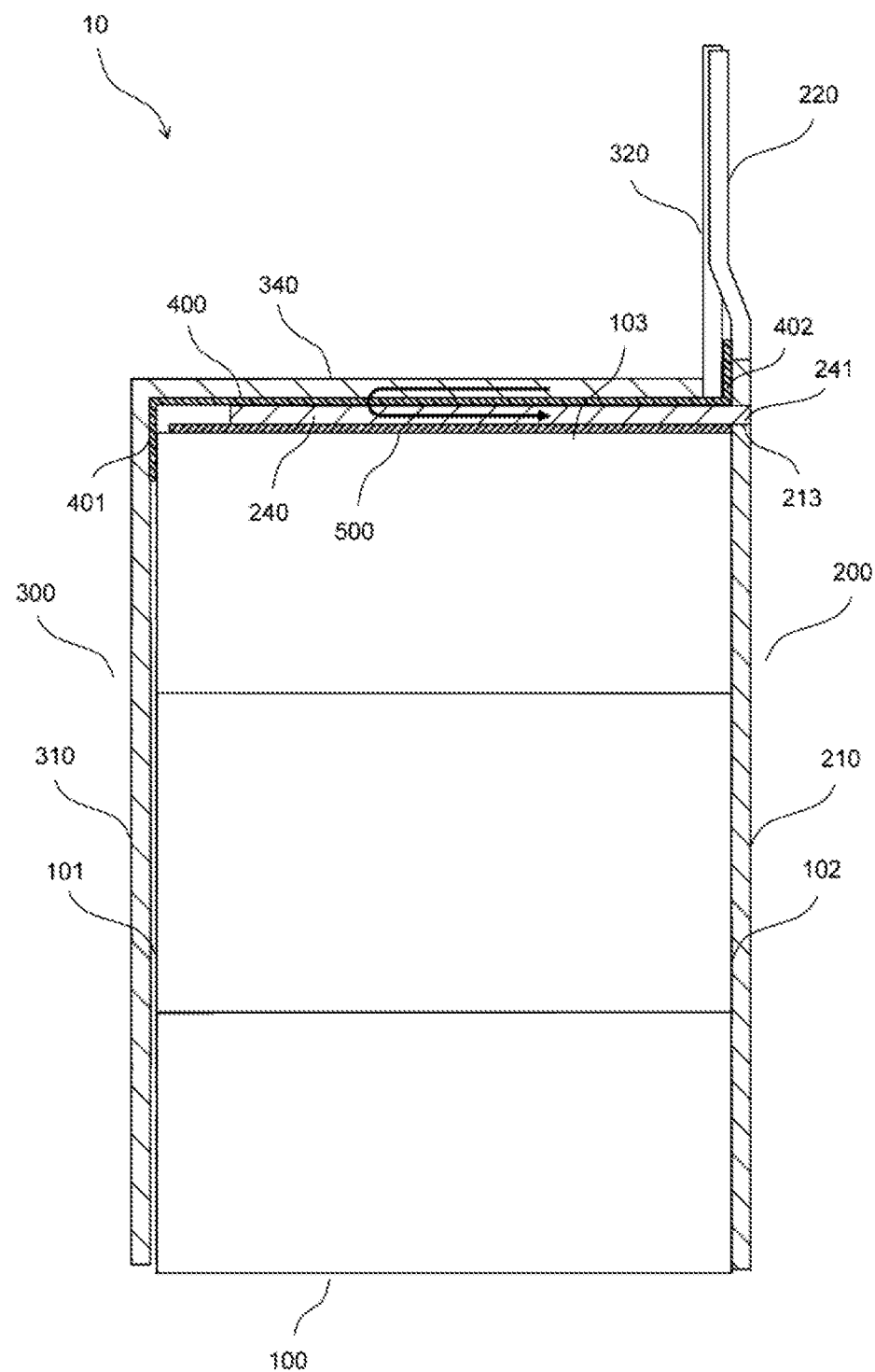
FIG. 5 is a sectional view illustrating a side surface of the capacitor unit of the exemplary embodiment that is cut in a front-rear direction at a position between a first connection terminal located second from the left and a second connection terminal located second from the left.

FIG. 1 is a perspective view illustrating film capacitor 1 of the exemplary embodiment. FIG. 2 is an exploded perspective view illustrating film capacitor 1 of the exemplary embodiment before capacitor unit 10 is accommodated in case 20. FIG. 3 is an exploded perspective view illustrating capacitor unit 10 of the exemplary embodiment. FIG. 4 is an exploded perspective view illustrating first bus bar 200 of the exemplary embodiment. FIG. 5 is a sectional view illustrating a side surface of capacitor unit 10 of the exemplary embodiment that is cut in a front-rear direction at a position between first connection terminal 220 located second from the left and second connection terminal 320 located second from the left.

Film capacitor 1 includes capacitor unit 10, case 20 in which capacitor unit 10 is accommodated, and filler resin 30 with which case 20 is filled. Case 20 has a substantially rectangular parallelepiped box shape, and a top surface of case 20 is open. Case 20 is made of a thermoplastics resin such as polyphenylene sulfide (PPS). Filler resin 30 made of a thermosetting resin such as an epoxy resin is injected into case 20 in a melting state, and cured by heating case 20. Filler resin 30 covers most of capacitor unit 10 including a capacitor element (to be described later) to protect most of capacitor unit 10 from moisture and impact.

Capacitor unit 10 includes four capacitor elements 100, first bus bar 200, second bus bar 300, first insulating sheet 400, second insulating sheet 500, and third insulating sheet 600.

Capacitor element 100 is formed by stacking two metalized films in each of which aluminum is deposited on a dielectric film, winding or laminating the stacked metalized films, and pressing the wound or laminated metalized films into a flat shape. Front-side end-face electrode 101 is formed on an end surface at a front side of capacitor element 100 by spraying metal such as zinc. Similarly, rear-side end-face electrode 102 is formed on an end surface at a rear side of capacitor element 100 by spraying metal such as zinc.

Four capacitor elements 100 are arranged in line such that peripheral surfaces 103 of capacitor elements 100 are adjacent to each other, and accommodated in case 20. While four capacitor elements 100 are accommodated in case 20, in each capacitor element 100, front-side end-face electrode 101 faces to a front side surface of case 20, and rear-side end-face electrode 102 faces to a rear side surface of case 20.

As described above, capacitor element 100 of the exemplary embodiment is made of the metalized films in each of which aluminum is deposited on the dielectric film. Meanwhile, capacitor element 100 may be made of the metalized films in each of which different metal such as zinc and magnesium is deposited on the dielectric film. Alternatively, from among such metals, capacitor element 100 may be made of the metalized films in each of which a plurality of metals among such metals are deposited on the dielectric film or the metalized films in each of which an alloy of such metals is deposited on the dielectric film.

First bus bar 200 made of a conductive material such as a copper plate includes first electrode connecting part 210, three first connection terminals 220, first side connection terminal 230, and branch part 240. As illustrated in FIG. 4, first electrode connecting part 210, three first connection terminals 220, and first side connection terminal 230 are included in main body 200a of first bus bar 200. For example, main body 200a is formed by cutting out and bending one copper plate as appropriate. First electrode connecting part 210, first connection terminal 220, and first side connection terminal 230 are integrally formed in main body 200a. Branch part 240 is made of the copper plate. Branch part 240 is formed as a member separated from main body 200a, and combined with main body 200a.

first electrode connecting part 210 has a laterally long rectangular plate shape, and covers rear-side end-face electrode 102 of capacitor element 100. In first electrode connecting part 210, rectangular opening 211 is formed at a position corresponding to rear-side end-face electrode 102 of each of capacitor elements 100. Two electrode pins 212 are formed at a peripheral edge of each opening 211, and are electrically connected to rear-side end-face electrode 102 by a connecting method such as soldering.

Three first connection terminals 220 are disposed at an upper end of first electrode connecting part 210, namely, on a line extending in a direction along a main surface of rear-side end-face electrode 102 with respect to first electrode connecting part 210. Each of first connection terminals 220 has a longitudinal rectangular plate shape, and are arranged at predetermined intervals in a left-right direction, namely, an array direction (longitudinal direction of case 20) of four capacitor elements 100. A lower part of each of first connection terminals 220 is bent such that an upper part of first connection terminal 220 overhangs slightly toward the front side. Circular attachment hole 221 is formed in each first connection terminal 220 so as to penetrate the front surface to the rear surface. An external terminal (not illustrated) is connected to each of first connection terminals 220 by screw clamp using attachment hole 221.

First side connection terminal 230 is disposed so as to overhand rightward from the upper part at a right end of first electrode connecting part 210. Circular attachment hole 232 is formed in leading edge 231 of first side connection terminal 230 so as to penetrate the front surface to the rear surface. An external terminal (not illustrated) is connected to leading edge 231 of first side connection terminal 230 by screw clamp using attachment hole 232.

Branch part 240 has a laterally long rectangular plate shape. Size D1 of branch part 240 in the front-rear direction is slightly smaller than size D3 between both the end faces of capacitor element 100, and size D2 in the left-right direction of branch part 240 is substantially equal to size D4 in the left-right direction of first electrode connecting part 210. As illustrated in FIG. 5, branch part 240 is branched from a position at the upper end of first electrode connecting part 210. And branch part 240 extends to a position near front-side end-face electrode 101 along peripheral surface 103 at the upper side of capacitor element 100. The position at the upper end of first electrode connecting part 210 is closer to first electrode connecting part 210 than first connection terminal 220 in first bus bar 200, and is a position (upper position) outside a main surface of rear-side end-face electrode 102 of capacitor element 100.

As illustrated in FIG. 4, a plurality of insertion pieces 241 are formed at the rear end of branch part 240. On the other hand, in main body 200a, insertion hole 213 corresponding to each of insertion pieces 241 is formed at the position of the upper end of first electrode connecting part 210. Insertion piece 241 is inserted into insertion hole 213, to fix branch part 240 to main body 200a. Insertion piece 241 and insertion hole 213 are bonded to each other by soldering. Insertion piece 241 and insertion hole 213 may be bonded to each other by a bonding agent except for solder. Alternatively, insertion piece 241 and insertion hole 213 may be welded to each other.

Second bus bar 300 made of a conductive material such as a copper plate includes second electrode connecting part 310, three second connection terminals 320, second side connection terminal 330, and overlapping part 340. For example, second bus bar 300 is formed by cutting out and bending one copper plate as appropriate. Second electrode connecting part 310, three second connection terminals 320, second side connection terminal 330, and overlapping part 340 are integrally formed in second bus bar 300.

Second electrode connecting part 310 has a laterally long rectangular plate shape, and covers front-side end-face electrode 101 of capacitor element 100. In second electrode connecting part 310, rectangular opening 311 is formed at a position corresponding to front-side end-face electrode 101 of each of capacitor elements 100. Two electrode pins 312 are formed at the peripheral edge of each opening 311, and are electrically connected to front-side end-face electrode 101 by a connecting method such as soldering.

Overlapping part 340 extends to the position near first connection terminal 220 along peripheral surface 103 of capacitor element 100 on the outside (upper side) of branch part 240 so as to continue from the upper end of second electrode connecting part 310 (see FIG. 5). Size D5 in the left-right direction of overlapping part 340 is slightly larger than size D2 in the left-right direction of branch part 240. Most of branch part 240 overlaps overlapping part 340 in an up-down direction.

Three second connection terminals 320 are disposed at a leading edge (rear edge) of overlapping part 340 so as to rise from overlapping part 340. Each of second connection terminals 320 has a longitudinal rectangular plate shape. Each of second connection terminals 320 is arranged at right side of each of first connection terminals 220. Circular attachment hole 321 is formed in each of second connection terminals 320 so as to penetrate the front surface to the rear surface. An external terminal (not illustrated) is connected to each of second connection terminals 320 by screw clamp using attachment hole 321.

Second side connection terminal 330 is provided so as to overhand rightward from right-end second connection terminal 320. Circular attachment hole 332 is formed in leading edge 331 of second side connection terminal 330 so as to penetrate the front surface to the rear surface. An external terminal (not illustrated) is connected to leading edge 331 of second side connection terminal 330 by screw clamp using attachment hole 332. Leading edge 331 of second side connection terminal 330 is arranged on the right of leading edge 231 of first side connection terminal 230.

First insulating sheet 400, second insulating sheet 500, and third insulating sheet 600 are made of an insulating paper or an insulating resin material such acryl and silicone.

First insulating sheet 400 has a laterally long rectangular shape, and is interposed between branch part 240 of first bus bar 200 and overlapping part 340 of second bus bar 300. Size D6 in the left-right direction of first insulating sheet 400 is larger than size D2 in the left-right direction of branch part 240. Front end 401 that is an edge part of first insulating sheet 400, which is close to second electrode connecting part 310, is bent downward, and extended downward along second electrode connecting part 310 so as to be interposed between the leading edge of branch part 240 and second electrode connecting part 310. Rear end 402 that is an edge part of first insulating sheet 400, which is close to first electrode connecting part 210, is bent upward, and extended upward along first electrode connecting part 210 so as to be interposed between a root of second connection terminal 320 and the upper end of first electrode connecting part 210 (see FIG. 5).

Second insulating sheet 500 has a laterally long rectangular shape, and is interposed between branch part 240 of first bus bar 200 and peripheral surface 103 at the upper side of each capacitor element 100. Third insulating sheet 600 has a slightly laterally long rectangular shape, and is interposed between first side connection terminal 230 and second side connection terminal 330 in a region where first side connection terminal 230 and second side connection terminal 330 overlap each other.

Film capacitor 1 is assembled in an inverter circuit of an automobile or the like, for example. When a power module of the inverter circuit performs switching operation, a high-frequency component greater than or equal to megahertz can overlap an AC voltage applied to film capacitor 1. In film capacitor 1, impedance between branch part 240 of first bus bar 200 and overlapping part 340 of second bus bar 300 is lower than impedance of capacitor element 100 with respect to the high-frequency component. For this reason, as indicated by an arrow in FIG. 5, current flows between branch part 240 and overlapping part 340 to generate cancel of inductance. Consequently the equivalent series inductance (ESL) in film capacitor 1 is reduced.

The reduction in ESL of film capacitor 1 reduces total inductance of a closed circuit constructed with the power module and film capacitor 1 of the inverter circuit, so that a surge voltage can be suppressed to prevent damage of the power module and the like when the power module performs the switching operation.

Effects of Exemplary Embodiment

As described above, the present embodiment exerts the following effects.

Since branch part 240 and overlapping part 340 that are overlapped with each other are provided in first bus bar 200 and second bus bar 300, the ESL in film capacitor 1 can be reduced.

Additionally, since branch part 240 and overlapping part 340 extend along peripheral surface 103 of capacitor element 100 and overlap each other in the up-down direction (an opening direction of case 20), the increase in the size of film capacitor 1 is suppressed unlike the configuration in which branch part 240 and overlapping part 340 stand from peripheral surface 103.

In first bus bar 200, first connection terminal 220 is disposed on a line extending in the direction along the main surface of rear-side end-face electrode 102 with respect to first electrode connecting part 210, and branch part 240 is branched from the position outside the main surface of rear-side end-face electrode 102, which is closer to first electrode connecting part 210 than first connection terminal 220. Thus, branch part 240 can be lengthened from the position near rear-side end-face electrode 102 toward front-side end-face electrode 101. On the other hand, in second bus bar 300, overlapping part 340 extends to the position near first connection terminal 220 along peripheral surface 103 of capacitor element 100 at the outside of branch part 240 so as to continue from second electrode connecting part 310, and second connection terminal 320 is disposed at the leading edge of overlapping part 340 so as to be arranged adjacent to first connection terminal 220. Thus, overlapping part 340 can be lengthened from the position near front-side end-face electrode 101 toward rear-side end-face electrode 102. Consequently, the overlapping portion of branch part 240 and overlapping part 340 is lengthened, so that the effect of decreasing the ESL can be enhanced.

First insulating sheet 400 disposed between branch part 240 and overlapping part 340 is extended along second electrode connecting part 310 such that front end 401 of first insulating sheet 400 is interposed between the leading edge of branch part 240 and second electrode connecting part 310. Thus, a creepage distance between the leading edge of branch part 240 and second electrode connecting part 310 can sufficiently be maintained by the interposition of front end 401 even if the leading edge of branch part 240 is brought close to second electrode connecting part 310. Consequently, branch part 240 is lengthened, so that the overlapping portion of branch part 240 and overlapping part 340 can be lengthened to enhance the effect of decreasing the ESL.

In first bus bar 200, main body 200a and branch part 240 can easily be combined by inserting insertion piece 241 in insertion hole 213. Additionally, insertion piece 241 and insertion hole 213 are bonded to each other by using the bonding agent or welding. Thus, main body 200a and branch part 240 are electrically firmly connected to each other. Consequently, when the current flows between branch part 240 and overlapping part 340, the current smoothly flows between main body 200a and branch part 240 so that the ESL can preferably be reduced.

The exemplary embodiment of the present disclosure has been described above. Meanwhile, the present disclosure is not limited to the above exemplary embodiment, and various modifications can be made in application examples of the present disclosure in addition to the above exemplary embodiment.

First Modification

Figure 6A:
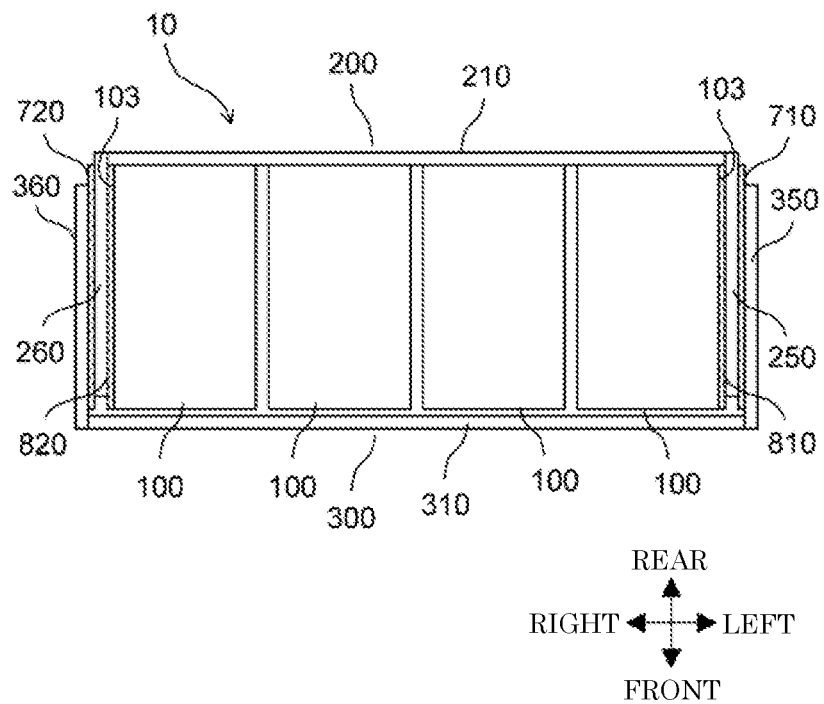
FIG. 6A is a schematic bottom view illustrating a capacitor unit according to a first modification.
Figure 6B:
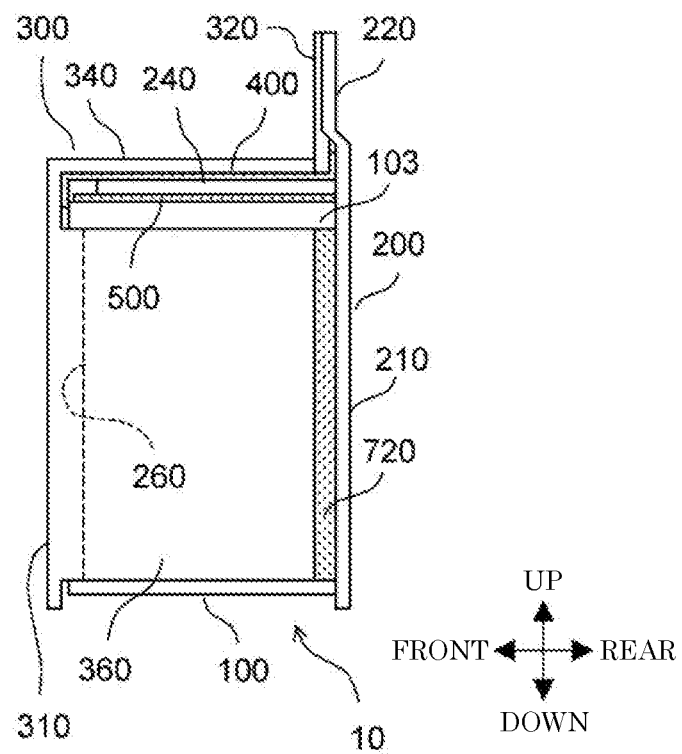
FIG. 6B is a schematic side view of the capacitor unit of the first modification.

FIG. 6A is a schematic bottom view illustrating capacitor unit 10 according to a first modification, and FIG. 6B is a schematic side view illustrating capacitor unit 10 of the first modification.

In the first modification, first left extending part 250 and first right extending part 260 correspond to "a first cover" described in the appended claims. Second left extending part 350 and second right extending part 360 correspond to "second cover" described in the appended claims.

In the first modification, in first bus bar 200, first left extending part 250 is extended from the left end of first electrode connecting part 210 so as to cover peripheral surface 103 on the left side of left-end capacitor element 100. And first right extending part 260 is extended from the right end of first electrode connecting part 210 so as to cover peripheral surface 103 on the right side of right-end capacitor element 100. Meanwhile, in second bus bar 300, second left extending part 350 is extended from the left end of second electrode connecting part 310 so as to cover peripheral surface 103 on the left side of left-end capacitor element 100 from the outside of first left extending part 250. And second right extending part 360 is extended from the right end of second electrode connecting part 310 so as to cover peripheral surface 103 on the right side of left-end capacitor element 100 from the outside of first right extending part 260. First left extending part 250, first right extending part 260, second left extending part 350, and second right extending part 360 have a longitudinal rectangular plate shape.

Fourth left insulating sheet 710 is disposed between first left extending part 250 and second left extending part 350, and fifth left insulating sheet 810 is disposed between first left extending part 250 and peripheral surface 103 of capacitor element 100. Similarly, fourth right insulating sheet 720 is disposed between first right extending part 260 and second right extending part 360, and fifth right insulating sheet 820 is disposed between first right extending part 260 and peripheral surface 103 of capacitor element 100. Fourth left insulating sheet 710, fourth right insulating sheet 720, fifth left insulating sheet 810, and fifth right insulating sheet 820 are made of an insulating paper or an insulating resin material such acryl and silicone.

First left extending part 250 and second left extending part 350 overlap each other, and first right extending part 260 and second right extending part 360 overlap each other. Consequently, similarly to the configuration of branch part 240 and overlapping part 340, the effect of decreasing the ESL in film capacitor 1 is expected.

Alternatively, first left extending part 250 and first right extending part 260 may be extended from the left end and the right end of branch part 240, and second left extending part 350 and second right extending part 360 may be extended from the left end and the right end of overlapping part 340. Further, only one of the configuration of first left extending part 250 and second left extending part 350 and the configuration of first right extending part 260 and second right extending part 360 may be provided. Further, first left extending part 250 and first right extending part 260 may be provided outside second left extending part 350 and second right extending part 360, respectively.

Second Modification

Figure 6C:
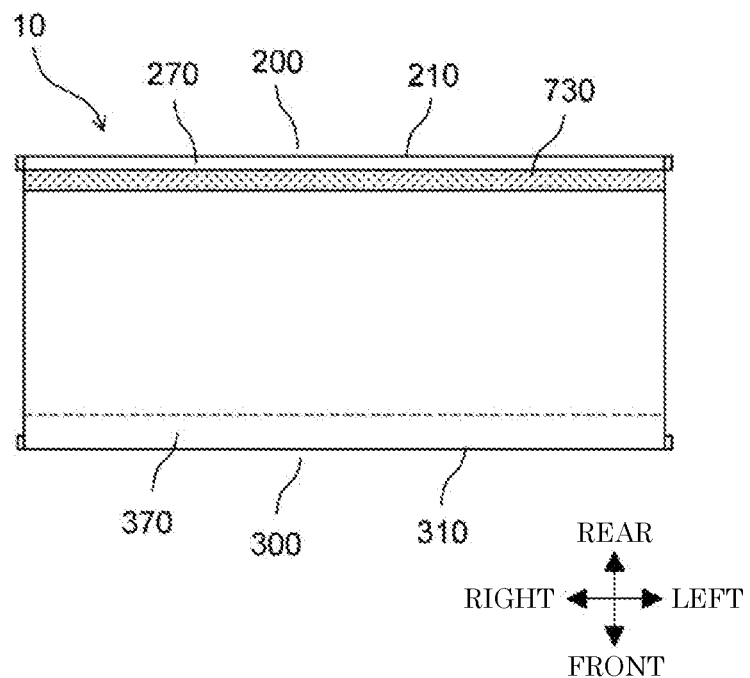
FIG. 6C is a schematic bottom view illustrating a capacitor unit according to a second modification.
Figure 6D:
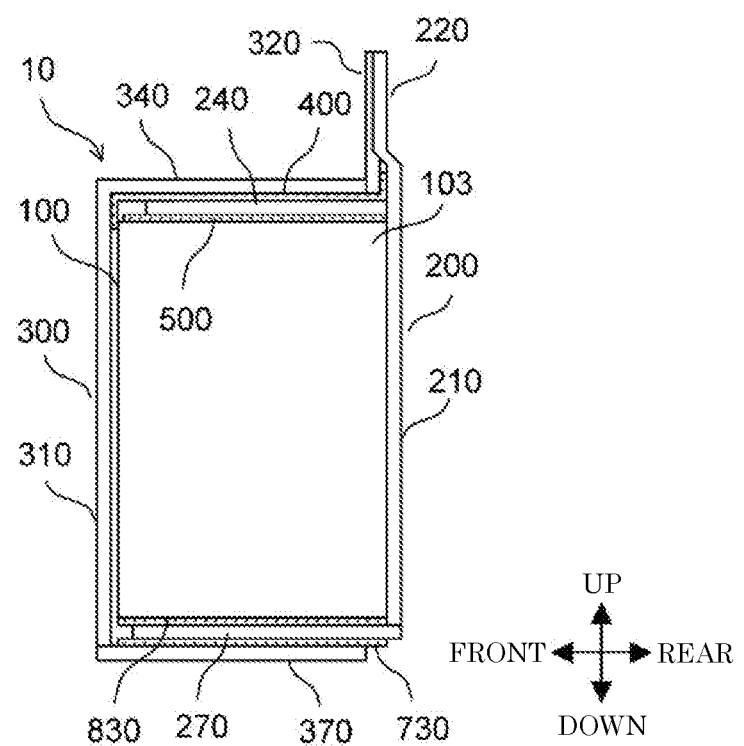
FIG. 6D is a schematic side view illustrating the capacitor unit of the second modification.

FIG. 6C is a schematic bottom view illustrating capacitor unit 10 according to a second modification, and FIG. 6D is a schematic side view illustrating capacitor unit 10 of the second modification.

In the second modification, first lower extending part 270 corresponds to "a first cover" described in the appended claims Second lower extending part 370 corresponds to "a second cover" described in the appended claims.

In the second modification, in first bus bar 200, first lower extending part 270 is extended from the lower end of first electrode connecting part 210 so as to cover peripheral surface 103 on the lower side of each capacitor element 100. Meanwhile, in second bus bar 300, second lower extending part 370 is extended from the lower end of second electrode connecting part 310 so as to cover peripheral surface 103 on the lower side of each capacitor element 100 from the outside of first lower extending part 270. First lower extending part 270 and second lower extending part 370 have a laterally long rectangular plate shape.

Fourth lower insulating sheet 730 is disposed between first lower extending part 270 and second lower extending part 370, and fifth lower insulating sheet 830 is disposed between first lower extending part 270 and peripheral surface 103 of capacitor element 100. Fourth lower insulating sheet 730 and fifth lower insulating sheet 830 are made of an insulating paper or an insulating resin material such acryl and silicone.

First lower extending part 270 and second lower extending part 370 overlap each other. Consequently, similarly to the configuration of branch part 240 and overlapping part 340, the effect of decreasing the ESL in film capacitor 1 is expected.

Alternatively, first lower extending part 270 may be provided outside second lower extending part 370. Further, in the first modification, at least one of the configuration of first left extending part 250 and second left extending part 350 and the configuration of first right extending part 260 and second right extending part 360 may be combined.

Other Modifications

In the above exemplary embodiment, in first bus bar 200, first connection terminal 220 is provided at a position (a position substantially flush with rear-side end-face electrode 102) immediately above first electrode connecting part 210 in order to increasing the length in the front-rear direction of branch part 240. Alternatively, first connection terminal 220 may be provided at a position where first connection terminal 220 enters an inside of capacitor element 100 as compared with the exemplary embodiment as long as branch part 240 has the length in which the effect of decreasing the ESL can sufficiently be secured.

In the above exemplary embodiment, in second bus bar 300, second connection terminal 320 is provided adjacent to first connection terminal 220 of first bus bar 200. Alternatively, second connection terminal 320 may be provided at another position.

A number of capacitor elements 100 contained in film capacitor 1 is not limited to the number specified in the above exemplary embodiment, but may appropriately be changed depending on required electrostatic capacitance. That is, in the above exemplary embodiment, four capacitor elements 100 are used, but not limited to this, alternatively, another number of capacitor elements 100 including one may be used.

In the above exemplary embodiment, capacitor element 100 is formed by stacking two metalized films in each of which aluminum is deposited on the dielectric film, and winding or laminating the stacked metalized films. Alternatively, capacitor element 100 may be formed by stacking an insulating film and the metalized film in which aluminum deposited on both sides of the dielectric film, and winding or laminating the stacked insulating film and the metalized film.

In the above exemplary embodiment, by way of example, the present disclosure is applied to what is called case mold type film capacitor 1 in which case 20 in which capacitor unit 10 is accommodated is filled with filler resin 30. The present disclosure may be applied to what is called a caseless type film capacitor in which the capacitor unit is not accommodated in the case but covered with an outer packaging resin.

In the above exemplary embodiment, film capacitor 1 is used as an example of the capacitor of the present disclosure. The present disclosure can be applied to a capacitor other than film capacitor 1.

In addition, various modifications can be made to the exemplary embodiment of the present disclosure as appropriate within the scope of the technical idea disclosed in the appended claims.

It should be noted that, in the description of the above exemplary embodiment, the term indicating the direction, such as "upward" or "downward", indicates the relative direction that only depends on a relative positional relationship of constituent members, and does not indicate the absolute direction such as the vertical direction or the horizontal direction.

The present disclosure is useful for capacitors used for various types of electronic devices, electrical devices, industrial equipment, electric components for vehicles, and the like.

What is claimed is:

1. A capacitor comprising:
   a capacitor element having a first end surface and a second end surface that faces to each other, and a peripheral surface connecting between the first end surface and the second end surface, the capacitor element including a first electrode disposed on the first end surface and a second electrode disposed on the second end surface;
   a first bus bar including a first electrode connecting part at one end of the first bus bar and a first connection terminal at another end of the first bus bar, the first electrode connecting part being connected to the first electrode of the capacitor element, the first connection terminal being configured to be connected to an external terminal; and
   a second bus bar including a second electrode connecting part at one end of the second bus bar and a second connection terminal at another end of the second bus bar, the second electrode connecting part being connected to the second electrode of the capacitor element, the second connection terminal being configured to be connected to an external terminal,
   wherein:
   the first bus bar includes a branch part that is branched from a position closer to the first electrode connecting part than the first connection terminal, the branch part extending toward the second electrode along the peripheral surface of the capacitor element,
   the second bus bar includes an overlapping part that overlaps at least a part of the branch part, the overlapping part being along the peripheral surface of the capacitor element,
   the first bus bar includes a first cover that is an extending part of the first bus bar to cover a first region in the peripheral surface of the capacitor element, the first region being a predetermined region except for a region covered with the branch part and the overlapping part,
   the second bus bar includes a second cover that is an extending part of the second bus bar to cover a second region in the peripheral surface of the capacitor element, the second region being a predetermined region except for a region covered with the branch part and the overlapping part, and
   the first cover and the second cover overlap each other.

2. The capacitor according to claim 1, wherein:
   in the first bus bar, the first connection terminal is disposed on a line extending in a direction along a main surface of the first electrode, and the branch part is branched from a position outside the main surface of the first electrode, the position being closer to the first electrode connecting part than the first connection terminal, and
   in the second bus bar, the overlapping part extends from a position close to the second electrode connecting part toward the first connection terminal along the peripheral surface of the capacitor element to cover the branch part, and the second connection terminal extends from a leading edge of the overlapping part to be arranged adjacent to the first connection terminal.

3. The capacitor according to claim 1, further comprising a partitioning member disposed between the branch part and the overlapping part, the partitioning member having an insulating property, wherein an edge part of the partitioning member extends along the second electrode connecting part to be disposed between a leading edge of the branch part and the second electrode connecting part, the edge part of the partitioning member being close to the second electrode connecting part.

4. The capacitor according to claim 1, wherein:

the first bus bar includes a main body including the first electrode connecting part and the first connection terminal, the branch part is formed as a member separated from the main body, the branch part is fixed to the main body by inserting an insertion part provided in the branch part into insertion port provided in the main body, and the insertion part and the insertion port are bonded to each other by using a bonding agent or welding.

* * * * *